United States Patent [19]
Barnette et al.

[11] 4,300,226
[45] Nov. 10, 1981

[54] COMPENSATION APPARATUS FOR A SERVO SYSTEM WITH PERIODIC COMMAND SIGNALS

[75] Inventors: William E. Barnette, Levittown, Pa.; Edward C. Fox, Cranbury, N.J.

[73] Assignee: RCA Corporation, New York, N.Y.

[21] Appl. No.: 777,477

[22] Filed: Mar. 14, 1977

[30] Foreign Application Priority Data

Mar. 19, 1976 [GB] United Kingdom ............... 11117/76

[51] Int. Cl.³ ...................... H04N 5/76; G11B 21/02; G11B 7/12
[52] U.S. Cl. .................... 369/45; 369/124; 250/201; 358/128.5; 318/662; 324/61 QS
[58] Field of Search ............ 358/128, 128.5; 179/100.1 S, 100.4 E, 100.3 V, 100.1 G; 360/73, 75; 318/318, 662; 361/280; 324/61 QS, 61 R; 250/570, 201; 369/45, 124

[56] References Cited

U.S. PATENT DOCUMENTS

| | | | |
|---|---|---|---|
| 3,187,256 | 6/1965 | Foster | 324/61 QS |
| 3,379,972 | 4/1968 | Foster | 324/61 QS |
| 3,808,486 | 4/1974 | Cuda | 318/620 |
| 3,825,323 | 7/1974 | Landwer | 318/662 |
| 3,873,763 | 3/1975 | Janssen | 358/128 |
| 3,934,262 | 1/1976 | Snopko | 358/4 |
| 3,946,166 | 3/1976 | Wossidlo | 358/128 |
| 4,005,260 | 1/1977 | Janssen | 179/100.3 V |

FOREIGN PATENT DOCUMENTS

| | | | |
|---|---|---|---|
| 2197195 | 3/1974 | France | 318/620 |
| 2198335 | 3/1974 | France | 369/45 |

*Primary Examiner*—Eberhard Faber
*Attorney, Agent, or Firm*—E. M. Whitacre; J. S. Tripoli; J. E. Roehling

[57] ABSTRACT

In a capacitance distance sensor apparatus in a focus servo loop for an optical disc playback and record system, stable high servo loop gain and small closed-loop error correction signals are achieved despite surface variations of the disc by compensating for the periodic error command signals generated by the surface variations.

A comb filter is provided in the loop tuned to major error component frequencies. The comb filter is formed of a plurality of parallel, bandpass filters that are tuned to frequencies substantially corresponding to the disc rotation frequency and several harmonics thereof. In the distance sensor servo focus control loop, the loop gain can be maintained at a high value to achieve proper beam focus within 0.5 micron ($0.5 \times 10^{-6}$ meters) for disc surface amplitude variation of three mils (0.0075 centimeters) peak-to-peak.

10 Claims, 6 Drawing Figures

COMPENSATION APPARATUS FOR A SERVO SYSTEM WITH PERIODIC COMMAND SIGNALS

CROSS REFERENCE TO RELATED APPLICATIONS

This application is related to the following copending U.S. applications, Ser. No. 777,474, entitled "Track Servo System" by L. Hedlund, et al., now U.S. Pat. No. 4,142,209, and Ser. No. 777,476, entitled "Capacitance Distance Sensor Apparatus" by W. Barnette, et al., now U.S. Pat. No. 4,183,060 both of which were filed on Mar. 14, 1977.

The present invention relates generally to a focus control servomechanism apparatus, and particularly to a novel automatic focus control apparatus used in an optical playback and record system comprising comb filters to achieve significantly high loop gains at frequencies predominant in the command signal without sacrifice of stability.

The filtering concept of the present invention is applicable in closed-loop automatic control systems having command signals containing large periodic components. An illustrative environment where such an application of the present invention is particularly advantageous is an optical disc system focus servo system, such as, for example, the capacitance probe distance measuring system disclosed in the aforementioned copending application of F. Spong and W. Barnette entitled "Capacitance Distance Sensor Apparatus" which maintains the position of a lens at a precise distance from the surface of a rotating disc. In this capacitance distance sensor circuit, a capacitance probe sensor is used to detect displacements of a rotating optical disc record relative to a scanning lens and to supply an error signal within the loop for driving a voice coil type lens position actuator in directions causing the lens to follow axial displacements of the disc's surface, termed in the art, "axial runout". The presence of such factors as warps of the disc's surface, can result in cyclical variations of relative motion between the scanning lens system and the surface of the disc that cause spurious fluctuations recurring at rates corresponding to the disc rotation frequency and harmonics thereof. The capacitance probe detects these cyclical variations of the disc. The frequency spectrum of the resulting command signal contains frequency components at harmonics of the turntable frequency. For efficient closed-loop operation, a small error signal can be realized without sacrifice of stability if the loop gain is made high at such harmonic frequencies.

In this invention, a plurality of tuned filters are inserted in parallel within a closed-loop system to form a comb filter network. Each filter is tuned to one of several harmonics at 1/T revolutions per sec. where T is the period of the cyclical source of the open loop error signal. Illustratively, in playback and record systems, T is the time required for one revolution of the disc. The comb filter for the playback and record system can be tuned to provide response peaks at dc and four harmonics of the turntable once around frequency to increase the loop gain at the major frequency components of the command signal, thus reducing these components in the closed loop error signal.

The disc material and disc construction dictate the number of harmonics and the level of loop gain required for the comb filter network. It has been found that with a disc made from a good glass substrate, a comb filter with response at dc and the first four harmonics is adequate to keep a focusing lens within the required depths of focus (i.e., the spacing wherein the light spot stays in focus). Stable loop gains of 2,000 have been achieved in the practice of this invention.

DETAILED DESCRIPTION

Figure 1:
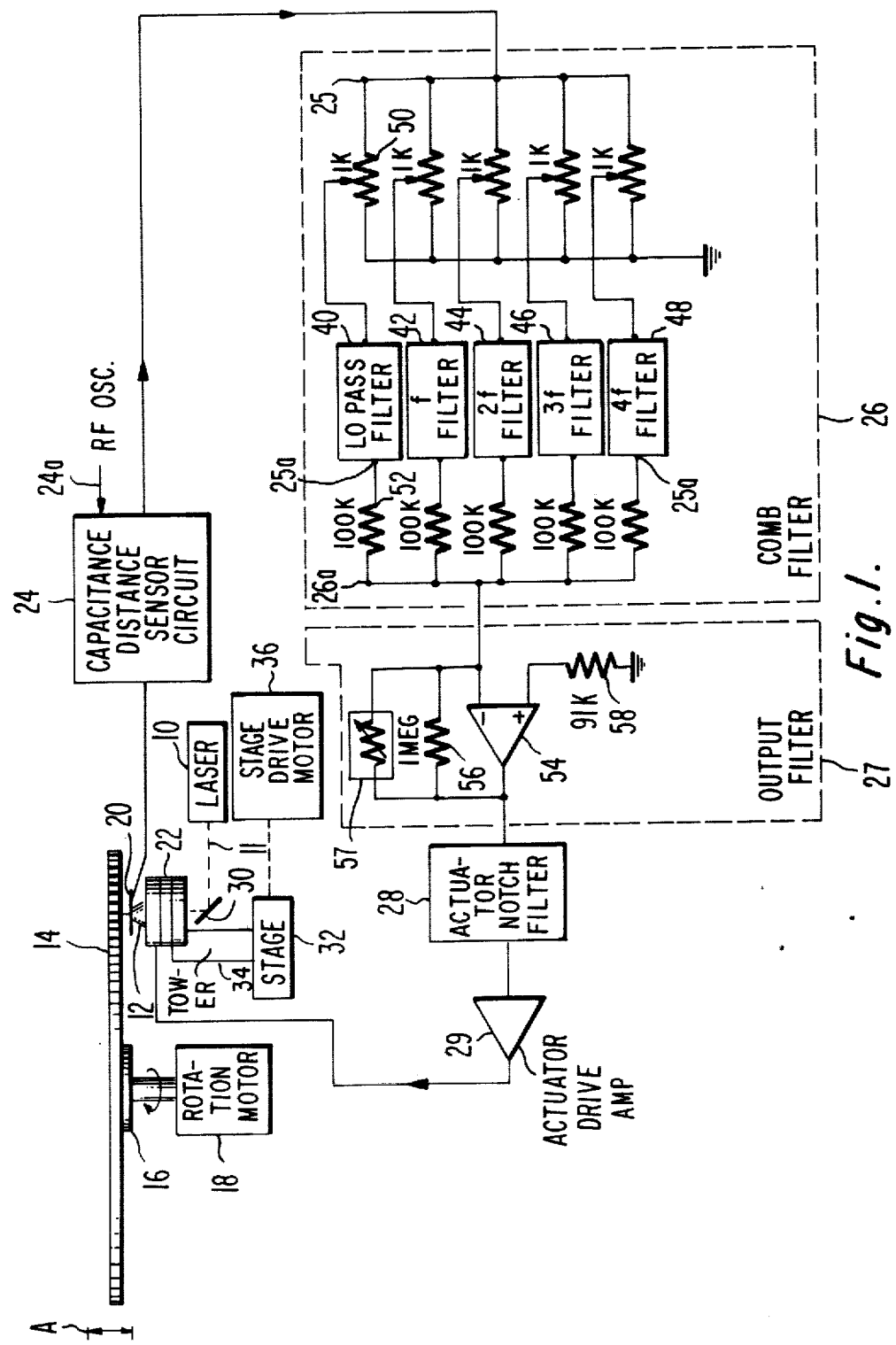
FIG. 1 illustrates in block diagram form a servo loop system for maintaining a fixed distance between a lens system and a rotating disc that utilizes the principles of this invention.

Reference is now made to FIG. 1. A beam of coherent light 11 from laser 10 is directed to galvanometer controlled mirror 30 in a path that is displaced but is substantially parallel to a surface of rotating disc 14. The light beam impinges upon a galvonometer controlled mirror 30 at an angle of incidence which causes the light beam to be deflected towards the reflective surface of disc 14 in a path perpendicular to the path of the incident beam. Light beam 11 passes through an aperture within the center region of a position actuator 22 and enters lens 12. Position actuator 22 is a well-known voice coil type position actuator used in this apparatus to change the position of lens 12 in a direction perpendicular to the surface of disc 14 in response to control signals applied to the voice coil. A first end of lens 12 is mounted to the end of actuator 22 that faces the surface of disc 14. Lens 12 focuses the light beam to form a light spot of a desired size on the track of rotating disc 14.

Disc 14, preferably a partially metallic coated disc to render a portion of the surface reflective, is fixedly mounted to a small circular turntable 16 which is rotated by motor 18 at a high rate of speed, for example, 1800 rpm. At this speed, the surface of disc 14 exhibits an axial displacement that occurs periodically as the disc is rotated. This motion, commonly referred to as runout "A", illustrates a typical range of axial runout. This runout has, generally, frequency components occurring at harmonics of 1/T, where T is the time required for each revolution of the disc. To maintain the light spot focused to a particular light spot size, lens 12 must be kept at a substantially fixed distance from the surface of rotating disc 14 notwithstanding the axial translations that may occur.

To sense the distance between the surface of disc 14 and lens 12, a capacitance probe 20 is fixedly mounted to a perimeter of lens 12 at a first end in a manner forming essentially an electrical capacitance between the probe 20 and the surface of disc 14. As disc 14 is rotated, the axial displacements of the surface of disc 14 facing the probe 20 causes a corresponding change in the capacitance between the probe 20 and the surface of disc 14. A suitable capacitance distance sensor circuit 24 coupled to probe 20, converts the changes in capacitance sensed by probe 20 into voltage error signals.

Sensor circuit 24 is energized by an RF oscillator source 24a. A preferred sensor circuit is described in the aforementioned copending application (RCA 70,687) of W. Barnette and F. Spong.

Figures 2A, 2B:
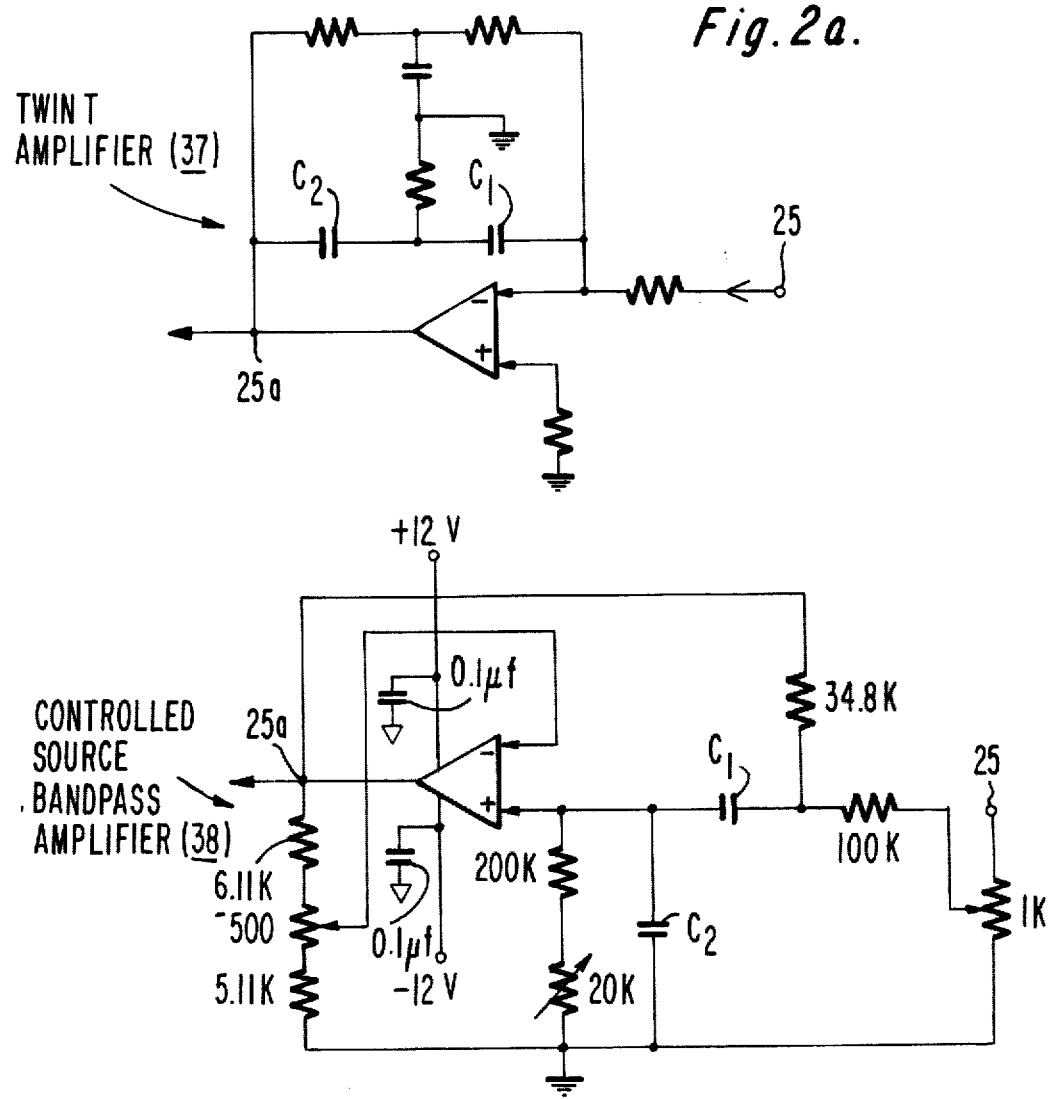
FIGS. 2A and 2B illustrate two filter networks, respectively, which may be employed to practice this invention.

The error signals are routed to a comb filter 26 that is coupled to the output of capacitance distance sensor circuit 24 via common terminal 25. Comb filter 26 is formed of a plurality of narrow bandwidth filters 40, 42, 44, 46, and 48 each tuned to a different frequency and gain substantially corresponding with a respective one of the harmonic components of rotating disc 14. The frequency response of each of the parallel filters 26 is selected to provide narrow bandwidths or peaks at dc and at typically four harmonics of the major error frequency. Filters 40-48 are connected in parallel between terminals 25 and 26a. Detailed circuits for the filters are shown in FIGS. 2A and 2B to be described. Each filter includes a gain control such as a one kilohm potentiometer 50 and an output 100 kilohm resistor 52. The output of comb filter 26 is coupled advantageously to an output amplifier 54 that provides added gain for increasing the sensitivity of the servo loop. Typically a type 3500 CN amplifier (manufactured by Burr-Brown Co., Tucson, Ariz.) serves for such amplification, suitably provided with a one megohm resistor 56 and a 91 kilohm grounding resistor 58. The output amplifier 27 may be provided with a suitable resistor 57 that has its resistance changed as a function of an RC time constant over several seconds from the time the servo loop is closed. Such a resistance is preferably variable from a low starting value of 300 kilohms to a very high maximum value in the order of 30 megohms. Thus, the effective shunting resistance of amplifier 54 varies, during the RC time period, between 230 kilohms and 1 megohm. This time-delayed variable resistor serves to slow the "turn-on" of the comb filter to prevent it from being shocked into oscillation by slowly varying the gain of the amplifier as a function of time.

The output of amplifier 54 is desirably coupled to an actuator compensator notch filter circuit 28. Filter 28 is a suitable notch filter that absorbs the frequency signal corresponding to the natural resonant frequency of the focus actuator 22 to further enhance the high gain characteristic of the servo loop. Actuator 22 is driven by actuator drive amplifier 29 to cause lens 12 to follow the axial displacements of disc 14 to maintain the desired focus position with very little error. The comb filter 26 functions to increase the loop gain at each of the cyclic error components allowing thereby provision for significantly high loop gain without endangering servo stability in the loop comprising the focusing apparatus 22 and the disc 14.

Typically, the distance between lens 12 and disc 14 must be maintained at ±0.25 microns (±0.25×10⁻⁶ meters), while flatness variations in the surface of disc 14 may produce axial runouts of, illustratively, 3 mils (0.076 millimeters) peak-to-peak. Such conditions require focus servo loop gains of at least 305. In general, the maximum axial displacement runout at a given frequency divided by the spacing tolerance between lens 12 and disc 14 is equivalent to the loop gain required at that frequency. According to one embodiment, a stable gain of 2000 allows for an axial runout of five mils for 0.0635 microns in disc surface variations.

During playback or record operations lens 12 is moved radially under disc 14 so that the focused light spot can follow the information track of the rotating disc 14. To effect movemet of the lens 12 without disturbing the lens beam paths, the actuator 22, to which the lens 12 is attached, and the galvanometer controlled mirror 30 are mounted to a carriage 34 which is in turn mounted to a translation means identified herein as a "stage" 32. Stage 32 is moved in a radial direction parallel to the surface of disc 14 by a stage drive motor 36 which is controlled by a controlling apparatus which is not shown but is disclosed in the aforementioned copending application of L. Hedlund et al. entitled "Track Servo System."

Reference is now made to FIGS. 2A and 2B which illustrate two suitable filter networks 37 and 38 that can be used to form the filters 42-48 of the comb filter 26 of FIG. 1. Either the well-known twin T amplifier circuit 37 or the controlled source bandpass amplifier circuit 38 will provide suitable filter characteristics and be operated in the parallel-sum configuration shown in FIG. 1. The controlled source bandpass amplifier 38 is the preferred filter since the desired bandwidth and center frequency of each filter of this configuration can be more conveniently achieved. The twin T amplifier is not as desirable since it requires precise matching of components. Such mismatching of components can cause instability, obviously undesirable in practicing this invention. Amplifier filter 38 is designed for each of filters 42, 44, 46, and 48 to provide the comb filter function for the fundamental frequency f and the harmonics $2f$, $3f$ and $4f$. Each filter includes an amplifier type 3500 BN and filter components as shown in FIG. 2B. The respective capacitances of capacitor $C_1$ and $C_2$ are tabulated in Table I:

TABLE I

| Frequency | $C_1$ (mfd) | $C_2$ (mfd) |
|---|---|---|
| f (30 Hz) | 0.1 | 0.05 |
| 2f (60 Hz) | 0.05 | 0.025 |
| 3f (90 Hz) | 0.035 | 0.018 |
| 4f (120 Hz) | 0.027 | 0.013 |

The low pass filter 40 (FIG. 1) may be of any suitable form to peak at direct current (dc-zero frequency) and filter frequencies up to the fundamental frequency f (30 Hz). However, the low pass filter must be of such design that it would not impair loop stability if it were the only filter in the loop. Suitable low pass filters are described in the Burr-Brown Operational Amplifier Handbook. Filter 40 provides the means to adjust the position of the lens to the desired focus. This position is thus the mean position of the lens and as such is the lens position at the rest position of the disc, i.e., at direct current (dc).

Figure 3A:
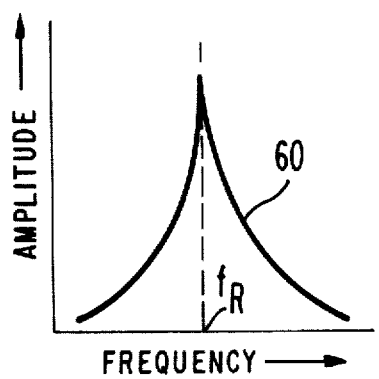
FIGS. 3A and 3B illustrate graphs of amplitude and phase with respect to frequency characteristics exhibited by the filter networks of FIGS. 2A and 2B, respectively.
Figure 3B:
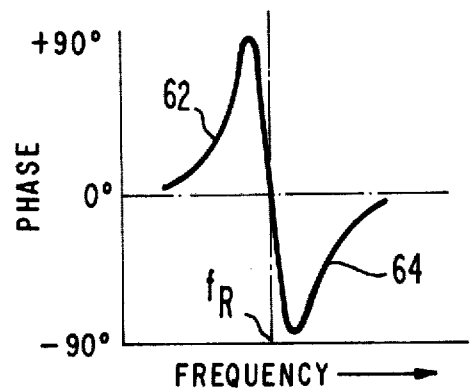

The amplitude and phase response characteristics of both of the two filter networks are illustrated in FIGS. 3A and 3B, respectively. FIG. 3A shows by response curve 60 the narrow bandwidth, sharply peaked at $f_R$, as shown or $2f$, $3f$, etc., that is attainable by means of the high Q feature of each of these respective filter circuits permitting the attainment of very high servo loop gains with excellent stability. FIG. 3B illustrates the phase response of each of the filters as they go from 0° phase to 90° phase lead (+) just below resonance ($f_R$) as per portion 62; 0° phase at resonance and 90° phase lag (−) and back towards 0° above resonance ($f_R$) as per portion 64. When these filters are operated in parallel, the phase shifts do not add but remain at a maximum of 90° lead or 90° lag. The 0° phase at each of the filter's center frequency ($f_R$) is desirable for this servo system.

Figure 4:
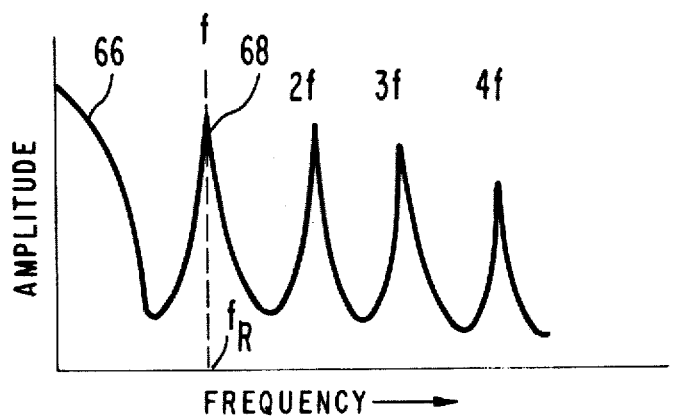
FIG. 4 illustrates the frequency response characteristics of the comb filter network.

FIG. 4 illustrates the frequency response curve for the comb filter 26 of FIG. 1. This filter provides response peaks at dc (portion 66), at the fundamental (f) of the once around rotational frequency (portion 68), and at the second (2f), third (3f) and fourth (4f) harmonics thereof. The number of harmonics that are to be filtered and the adjustable loop gain of each of such harmonics is determined by the material and the construction of the disc 14. As indicated above, it was found that with good glass substrates, a comb filter 26 with response peaks at zero frequency (dc), and the first four harmonics as illustrated in FIG. 4, was adequate for focus maintenance under the conditions stated above.

When recording or playing back the video disc, the axial runout changes very slowly when moving radially across the disc. Such a slow movement allows for the bandwidth of each of the "teeth", that is, each filter 40-48, of the comb filters 26 to be very narrow as a consequence of having a very high Q. As the selected value of Q is increased to higher values, the 90° phase lag (portion 64 of FIG. 3B) is more sharply peaked and occurs closer to the center frequency ($f_R$) which has a 0° shift. Furthermore, the phase approaches zero degrees more rapidly as the frequency increases beyond the resonant frequency. Accordingly, this allows for the closed loop servo gain to be much higher. Further the parallel arrangement of the separate filters according to the invention provides for broad use and versatility whereby the gain and Q of each tooth of the comb can be tailored to the requirements of the disc substrate.

There is thus described apparatus for compensating for command signals that are periodic. The compensation apparatus is implemented in a servo loop controlling the distance of a capacitance sensor relative to a surface, such as a rotating disc, which is subject to periodic axial runout. The command signal, indicative of the distance manifested in the embodiment by variations in capacitance, is compared to the output signal of the filter of the servo loop to generate the error signal manifesting displacement of the sensor from a preselected fixed distance. The filter is a comb filter tuned to each of the components of the periodic command signals. Significantly high loop gains at the frequencies predominant in the command signal are provided without the sacrifice of loop stability.

This invention is not limited in use to a focusing servo using a capacitance distance sensor. In general, the invention will be useful in any servo loop environment in which a periodic command signal at a given frequency has a plurality of significant harmonics. Further, although the medium described is a rotating disc, it will be appreciated that any surface having periodic command signals may be used in the practice of this invention. Thus, rotating drums and cylinders may be used in practicing the invention.

What is claimed is:

1. An apparatus for use in an information record playback and recording system for maintaining constant the distance of an objective lens relative to a conductive surface of the record which rotates at a given periodic rate, said apparatus comprising:
   a. a probe having an electrode, said probe being connected to an end of said objective lens, said electrode and said conductive surface forming a capacitance element,
   b. capacitance sensing means coupled to said electrode for sensing variations from a predetermined value in the capacitance formed between said electrode and said disc and for generating an error signal that varies in accordance with said sensed variations in capacitance, said error signal having a frequency spectrum containing frequency components at harmonics of said given periodic rate,
   c. filter means coupled to the output of said capacitance sensing means for providing peak responses at frequencies substantially corresponding to zero frequency, to said given periodic rate and to one of the harmonics of said given periodic rate, and
   d. means coupled to said lens and responsive to the output of said filter means for positioning said lens in a manner which opposes the departure of the sensed capacitance from said predetermined value.

2. Apparatus according to claim 1 wherein said filter means includes a plurality of filters connected in parallel, each of said filters being resonantly tuned to a respective frequency corresponding to one of said zero frequency, said given periodic rate and said one of the harmonics of said given periodic rate.

3. Apparatus according to claim 2 wherein each of said filters has a phase response characteristic that varies in phase relative to frequency, within a band of frequencies which includes the resonant frequency of the filter between plus ninety degrees and minus ninety degrees while passing through zero degrees at frequencies substantially at the resonant frequency of the filter.

4. Apparatus according to claim 1 wherein said positioning means has a natural resonant frequency, and further comprising a notch filter in said servo loop, said notch filter being tuned to said natural resonant frequency.

5. In a servo loop for maintaining constant the distance between a surface and a probe wherein relative motion is established between the surface and the probe at a given periodic rate, which loop comprises means for generating an error signal that varies in accordance with variations from a given value in the distance between said probe and said surface, said error signal having a frequency spectrum containing frequency components at harmonics of the given periodic rate, an apparatus comprising the combination of:
   filter means, coupled to the output of said generating means, for providing peak responses at frequencies substantially corresponding to zero frequency, to said given periodic rate and to one of the harmonics of said given periodic rate; and
   means coupled to said probe and responsive to the output of said filter means for positioning said probe relative to said surface in a manner which opposes variations in the distance between said probe and said surface from said given value.

6. Apparatus according to claim 5 wherein said filter means includes a plurality of filters connected in parallel, each of said filters being resonantly tuned to a respective frequency corresponding to one of said zero frequency, said given periodic rate and said one of the harmonics of said given periodic rate.

7. Apparatus according to claim 6 wherein each of said filters has a phase response characteristic that varies in phase relative to frequency, within a band of frequencies which includes the resonant frequency of the filter, between plus ninety degrees and minus ninety degrees while passing through zero degrees at frequencies substantially at the resonant frequency of the filter.

8. Apparatus according to claim 5 wherein said positioning means has a natural resonant frequency, and further comprising a notch filter in said servo loop, said notch filter being tuned to said natural resonant frequency.

9. Apparatus according to claim 5 wherein said servo loop further comprises a high gain amplifier which includes a feedback loop comprising a time-delayed variable resistance that varies between a relatively low value to a relatively high value of resistance to vary the gain of the amplifier as a function of time to thereby prevent the filter from shock oscillations.

10. In a servo loop for maintaining constant the distance between a surface and a probe wherein relative motion is established between the surface and the probe at a given periodic rate, which loop comprises means for generating an error signal that varies in accordance with variations from a given value in the distance between said probe and said surface, said error signal having a frequency spectrum containing frequency components at harmonics of the given periodic rate, an apparatus comprising the combination of:

filter means, coupled to the output of said generating means, for providing peak responses at frequencies substantially corresponding to said given periodic rate and to one of the harmonics of said given periodic rate; and means coupled to said probe and responsive to the output of said filter means for positioning said probe relative to said surface in a manner which opposes variations in the distance between said probe and said surface from said given value.

* * * * *